United States Patent [19]

Ureshino et al.

[11] Patent Number: 5,783,983

[45] Date of Patent: Jul. 21, 1998

[54] INTERNAL MIXER

[75] Inventors: Kashiro Ureshino; Norifumi Yamada; Ko Takakura; Yoshinori Kurokawa, all of Takasago, Japan

[73] Assignee: Kabushiki Kaisha Kobe Seiko Sho, Kobe, Japan

[21] Appl. No.: 791,620

[22] Filed: Jan. 31, 1997

[30] Foreign Application Priority Data

Jan. 31, 1996 [JP] Japan ............... 8-038874

[51] Int. Cl.$^6$ ............................................. B01F 7/02
[52] U.S. Cl. .................. 336/76.7; 366/77; 366/150.1
[58] Field of Search .................. 366/70, 76.1, 76.7, 366/77, 84, 150.1, 151.1, 151.2, 97; 425/200, 201, 207, 209

[56] References Cited

U.S. PATENT DOCUMENTS

| | | | |
|---|---|---|---|
| 2,351,706 | 6/1944 | Robinson | 366/76.7 |
| 3,057,008 | 10/1962 | Hartmann et al. | 366/76.7 |
| 4,877,328 | 10/1989 | Muller et al. | 366/76.7 |
| 4,953,984 | 9/1990 | Miyoshi | 366/76.93 |
| 5,061,078 | 10/1991 | Yada | 366/84 |
| 5,460,445 | 10/1995 | Miyoshi et al. | 366/76.7 |
| 5,529,390 | 6/1996 | Giani et al. | 366/76.7 |

FOREIGN PATENT DOCUMENTS

| | | |
|---|---|---|
| 19206 | 1/1988 | Japan. |
| 19207 | 1/1988 | Japan. |
| 2231503 | 11/1990 | United Kingdom ............... 366/76.7 |

*Primary Examiner*—Tony G. Soohoo
*Attorney, Agent, or Firm*—Oblon, Spivak, McClelland, Maier & Neustadt, P.C.

[57] ABSTRACT

An internal mixer having a floating weight disposed in contiguous with an internal mixer main body and made elevatable in a hopper to which a material to be mixed is charged, wherein a hydraulic cylinder for elevating the floating weight is disposed in contiguous with the internal mixer main body, a pneumatic/hydraulic pressure conversion means for pressure conversion between a hydraulic side and a pneumatic side is disposed separately from the internal mixer main body, and the hydraulic side of the hydraulic cylinder for lowering the floating weight is connected with the hydraulic side of the pneumatic/hydraulic pressure conversion means. The reliability of the internal mixer can be improved while making the structure compact and facilitating the maintenance operation.

4 Claims, 5 Drawing Sheets

INTERNAL MIXER

BACKGROUND OF THE INVENTION

1. Field of the Invention

The present invention concerns an internal mixer having a feature in an operation portion for a floating weight.

2. Description of the Prior Art

Figure 4A:
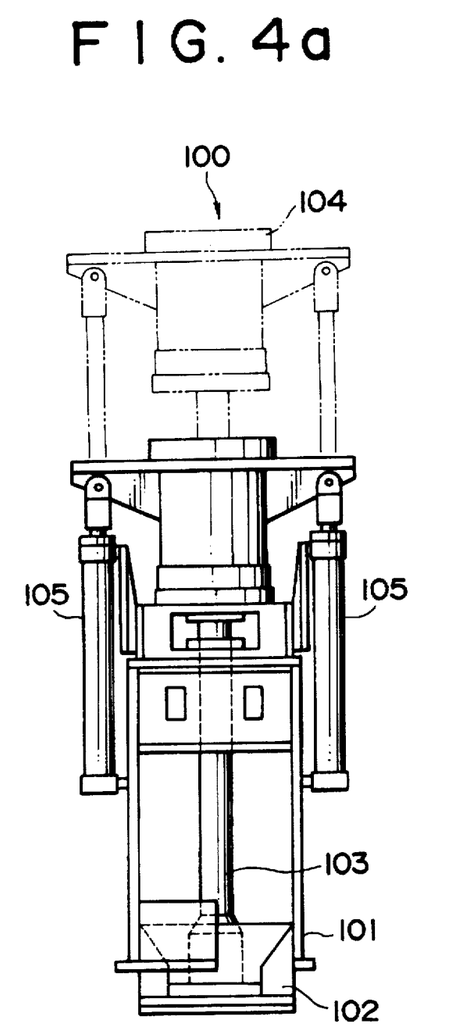
FIG. 4 is a cross sectional view illustrating the constitution of an internal mixer of the prior art.
Figure 4B:
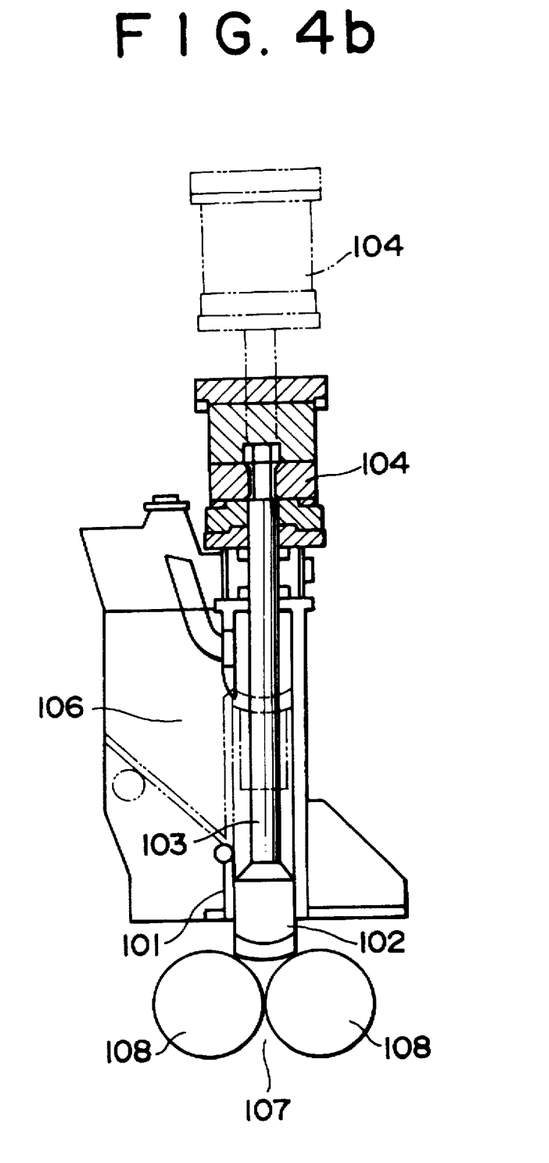

An internal mixer of the prior art is disclosed, for example, in Japanese Patent Laid-Open Sho 63-19207. As shown in FIG. 4(a) and (b), the internal mixer of this type has a floating weight 102 disposed in contiguous with an internal mixer main body 100 and elevatable in a hopper 101, in which an air cushion cylinder 104 is disposed by way of a piston rod 103 to an upper portion of the floating weight 102, and hydraulic cylinders 105 are secured to the out side of the hopper 101 for elevating the floating weight 102 together with the cushion cylinder 104.

A material to be mixed (hereinafter referred to as a raw material) is mixed by charging the raw material from a charging port 106 of the hopper 101, lowering the floating weight 102 together with the cushion cylinder 104 by the operation of the hydraulic cylinder 105, forcing the raw material in the hopper 101 into a mixing chamber 107 of the internal mixer main body 100 and then rotating mixing rotors 108 disposed in the mixing chamber 107. In this case, the reaction exerted on the floating weight 102 is cushioned when the piston rod 103 is raised slightly by the presence of a pneumatic pressure in the air cushion cylinder 102 thereby balancing the pressure between the upper and the lower chambers in the cylinder 104, to provide a cushioning function to the movement of the floating weight 102.

However, since the internal mixer of the prior art has a structure in which the air cushion cylinder 104 is disposed by way of the piston rod 103 above the floating weight 102 (hopper 101), a predetermined size is required in the direction of the height of the internal mixer, and the hydraulic cylinder 105 and the air cushion cylinder 104 are likely to be contaminated with surrounding circumstances such as the raw material charged in the hopper 101 and dusts present in the internal mixer.

Further, since the air cushion cylinder 104 is elevated together with the floating weight 102, it requires to dispose pipelines for supplying and discharging a pneumatic air along with elevation and maintenance is required also for the pipeline.

SUMMARY OF THE INVENTION

It is an object of the present invention to overcome such problems in the prior art and provide a highly reliable internal mixer while making the structure compact and facilitating maintenance operation.

The foregoing object can be attained in accordance with the present invention by an internal mixer comprising a floating weight disposed in contiguous with an internal mixer main body and made elevatable in a hopper to which a material to be mixed is charged, a hydraulic cylinder for elevating the floating weight which is disposed in contiguous with the internal mixer main body, and a pneumatic/hydraulic pressure conversion means for pressure conversion between a hydraulic side and a pneumatic side which is disposed separately from the internal mixer main body. The hydraulic side of the hydraulic cylinder for lowering the floating weight is connected with the hydraulic side of the pneumatic/hydraulic pressure conversion means.

In the present invention described above, the floating weight can be lowered so as to enforce the raw material into the internal mixer main body by the supply of a pressure on the pneumatic side to be converted by the pneumatic/hydraulic conversion means to the hydraulic pressure. Further, when the floating weight undergoes reaction by way of the raw material from the internal mixer main body, the reaction is returned as a hydraulic pressure to the pneumatic/hydraulic pressure conversion means and converted into the pneumatic pressure by the pneumatic/hydraulic pressure conversion means, whereby the reaction is received in a damped manner to provide the floating weight with the cushioning function.

As described above, when the pneumatic/hydraulic pressure conversion means for providing the floating weight with the cushioning function is disposed separately from the internal mixer main body, whereby the size in the direction of the height of the internal mixer is lowered into a compact structure, this can facilitate integral transportation, installation to a facility or the like and maintenance.

Further, since the pneumatic/hydraulic pressure conversion means is disposed separately from the internal mixer main body, only the hydraulic cylinders suffer from the effect of the circumstances such as the raw material to be charged into the hopper and dusts present in the internal mixer, and no disposition for the pipelines to follow after the elevation of the floating rate is necessary, mixing can be conducted with easy maintenance and high reliability.

Further, since the pneumatic/hydraulic pressure conversion means provides a function to the floating weight by the pressure conversion between the hydraulic and the pneumatic pressures, the pneumatic pressure consumption and discharging sound can be eliminated and the running cost can be reduced.

Switching from the direct supply of the hydraulic pressure from the hydraulic circuit to the hydraulic chambers of the hydraulic cylinders to the supply of the hydraulic pressure from the hydraulic chamber of the pneumatic/hydraulic pressure converter, in order to lower the floating weight, may be conducted by switching from direct supply of the hydraulic oil from the hydraulic circuit to the hydraulic chambers of the hydraulic cylinders to the supply of the hydraulic pressure from the hydraulic chamber of the pneumatic/hydraulic pressure converter by detecting the lowering distance of the floating weight or the hydraulic pressure exerting in the hydraulic cylinders by detection means and at a point where a predetermined distance or a predetermined pressure is reached.

In a preferred embodiment, the pneumatic side of the pneumatic/hydraulic pressure switching means is supplied with pneumatic pressure through a pneumatic tank.

Thus, when the floating weight undergoes the reaction from the internal mixer main body and if this is returned as the hydraulic pressure to the pressure side of the pneumatic/hydraulic pressure conversion means, the pneumatic pressure of the pneumatic side is increased but this is absorbed by the pneumatic tank to thereby enabling to reduce the abnormal pressure elevation on the pneumatic side of the pneumatic/hydraulic pressure conversion means.

In another preferred embodiment, the hydraulic side of the pneumatic/hydraulic pressure conversion means is made switchable to each of the hydraulic side of the hydraulic cylinder and the auxiliary hydraulic circuit for supplying the hydraulic pressure.

In this embodiment, when the hydraulic side of the pneumatic/hydraulic pressure conversion means and a hydraulic circuit are connected, the hydraulic pressure of forcing the raw material by the floating weight into the internal mixer main body can be accumulated in the hydraulic side of the pneumatic/hydraulic pressure conversion means to attain an initial state, and when the hydraulic side of the pneumatic/hydraulic pressure conversion means and the hydraulic of the hydraulic cylinder are connected, the floating weight can be provided with the cushioning function.

In a further preferred embodiment, a stem connected with the floating weight is attached to a beam and rods of the hydraulic cylinders are connected to both ends of the beam, by which the floating weight is made elevatable in the hopper.

In this embodiment, since the members supported by the hydraulic cylinder are the floating weight, the stem and the beam, the rigidity of the internal mixer main body and the hopper can be reduced, so that the weight and the manufacturing cost of the internal mixer per se can be reduced.

Further, since the hydraulic cylinder is integrated by way of the stem and the beam with the floating weight, the oil leaked from the hydraulic cylinder does not intrude from the hopper into the internal mixer main body.

DESCRIPTION OF PREFERRED EMBODIMENTS

The internal mixer according to the present invention will be explained with reference to FIG. 1 to FIG. 3.

Figure 1:
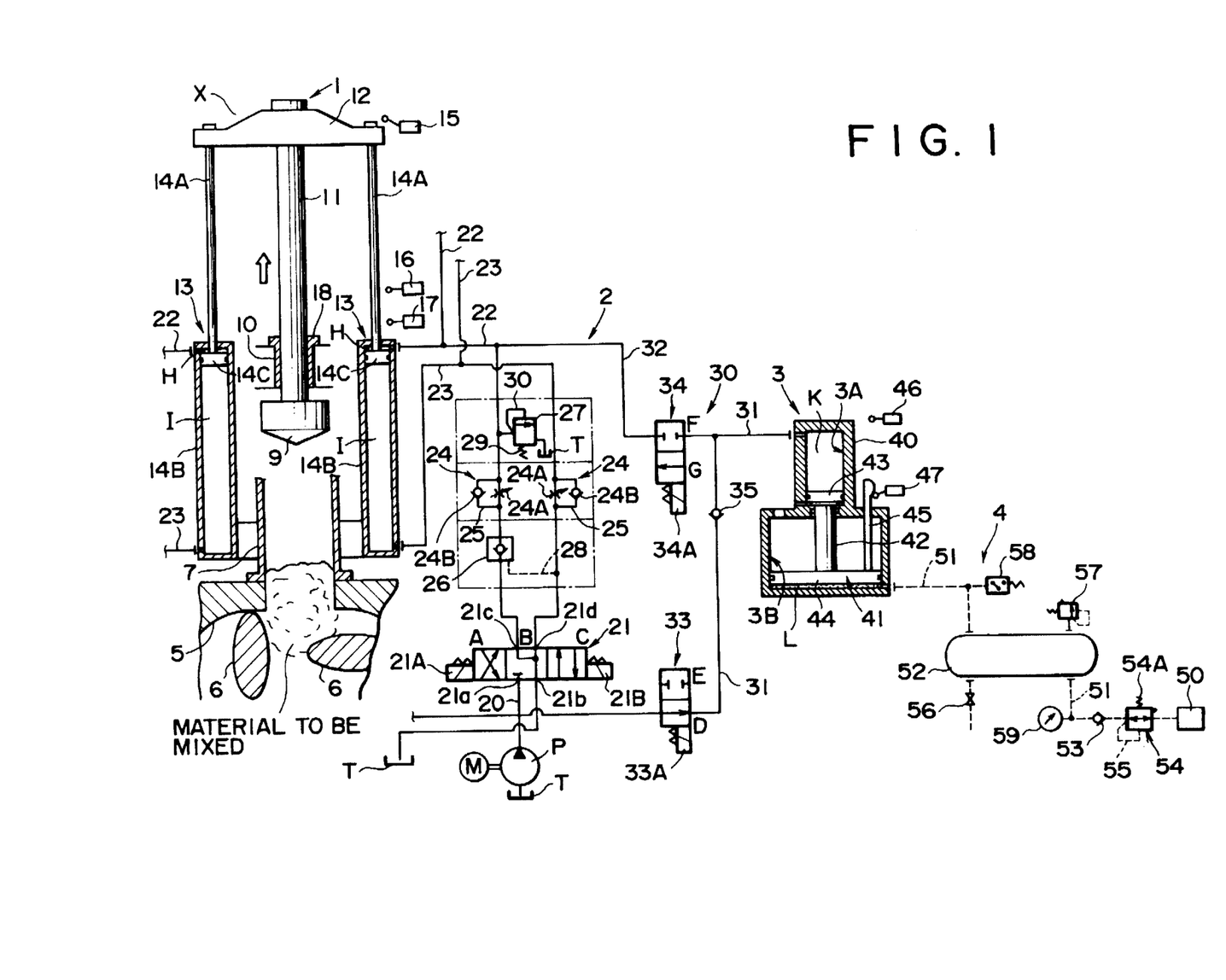
FIG. 1 is an entire schematic view for explaining the constitution of an internal mixer of the present invention and the state of uprising operation thereof.
Figure 2:
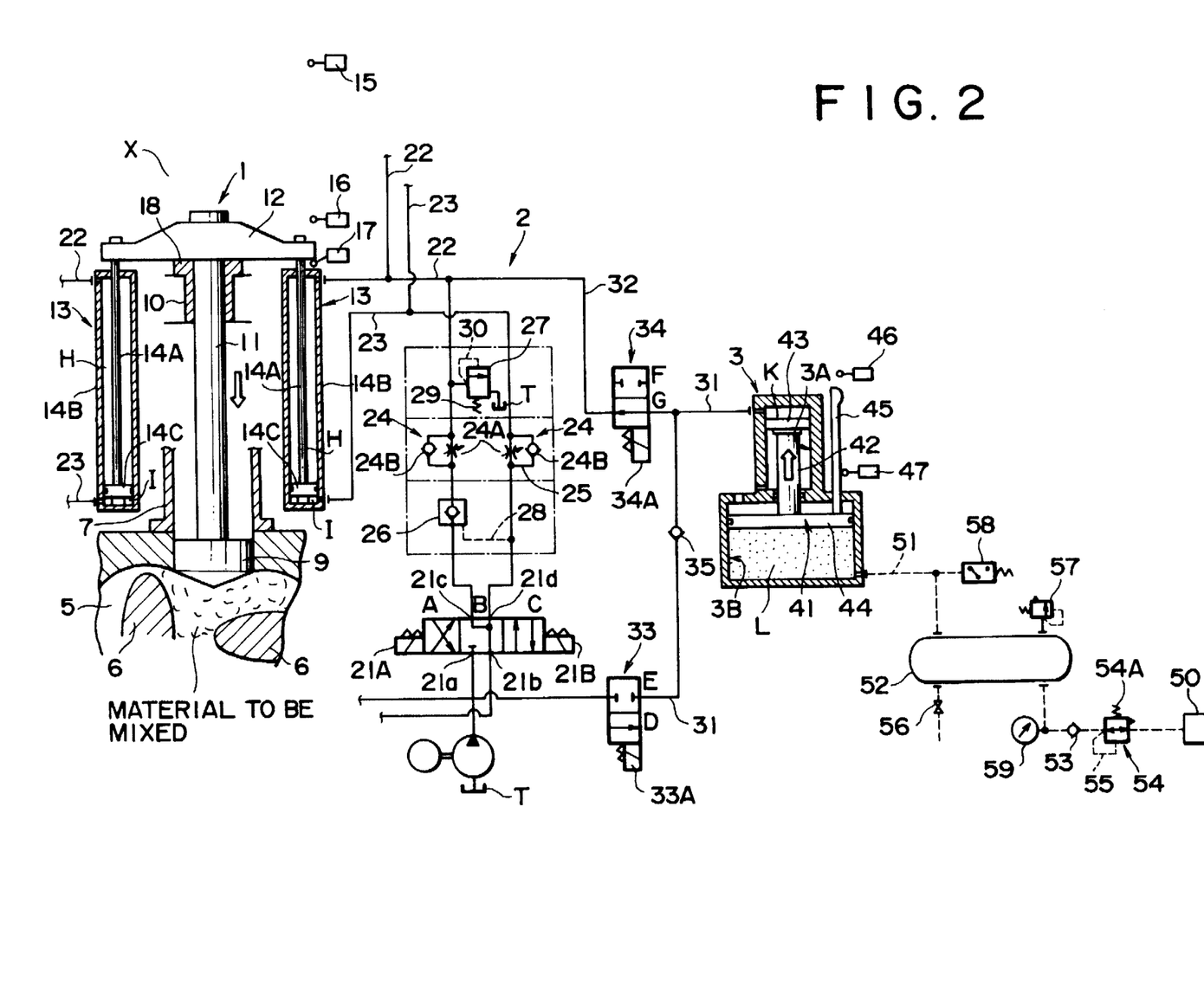
FIG. 2 is an entire schematic view for explaining the constitution of an internal mixer of the present invention and the state of lowering operation thereof.
Figure 3:
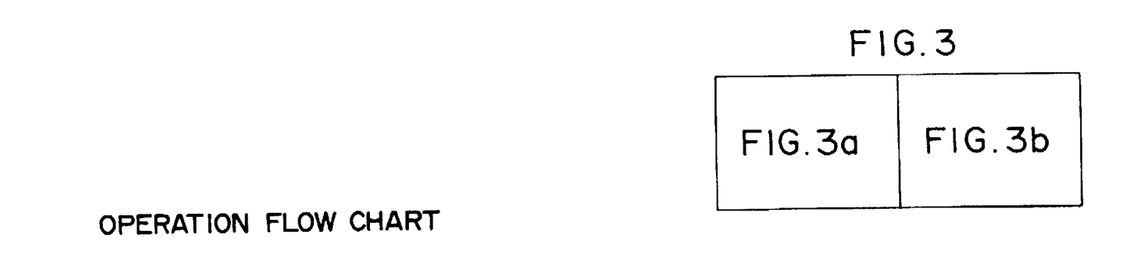
FIG. 3 is an operation flow chart for explaining the operation of the internal mixer according to the present invention.
Figure 3A:
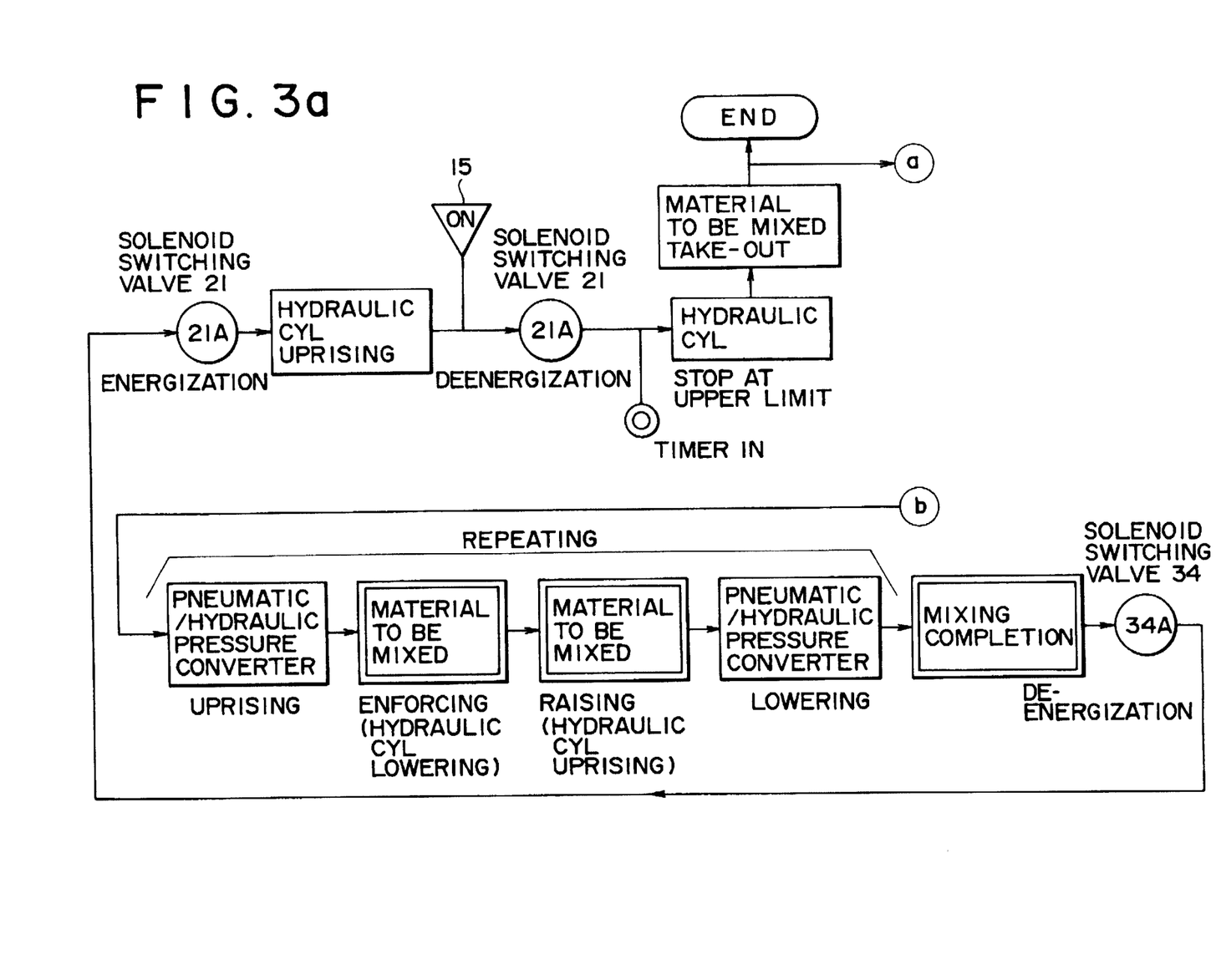
Figure 3B:
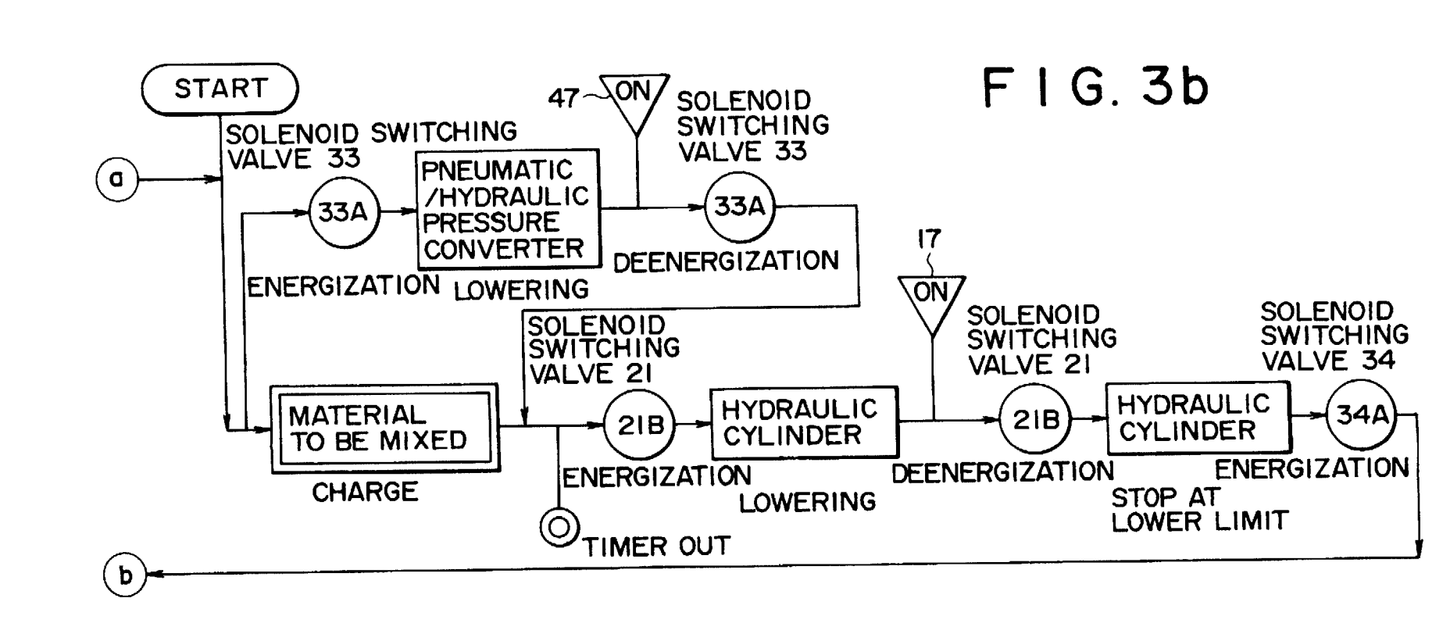

FIG. 1 is an entire schematic view for explaining the constitution of an internal mixer of the present invention and the state of uprising operation thereof FIG. 2 is an entire schematic view for explaining the constitution of an internal mixer in the present invention and the state of lowering operation thereof and FIG. 3 is an operation flow chart for explaining the operation of the internal mixer according to the present invention.

In FIG. 1 and FIG. 2, an internal mixer X comprises, as a principal portion, an internal mixer main body 1, a hydraulic circuit 2 for charging and discharging a hydraulic oil to and from the internal mixer main body 1, a pneumatic/hydraulic pressure convertor 3 (pneumatic/hydraulic pressure conversion means) connected by way of an auxiliary hydraulic circuit 30 to the hydraulic circuit 3 disposed separately from the internal mixer main body 1 and a pneumatic circuit 4 connected to the pneumatic/hydraulic pressure convertor 3.

In the internal mixer main body 1, mixing rotors 6, 6 are disposed in a mixing chamber 5 having a not illustrated drop door at the bottom, and a hopper 7 is in contiguous with an upper portion of the mixing chamber 5. A floating weight 9 slidable in the hopper 7 is disposed above the upper end of the hopper 7, and the floating weight 9 is secured to lower end of a stem 11 (shaft member) extending slidably through a guide bush 10 on the upper end of the hopper 7. The upper end of the stem 11 is integrated by way of a connecting beam 12 with cylinder rods 14A, 14A of a pair of hydraulic cylinders 13, 13 disposed securely to the outside of the hopper 7. Each of the hydraulic cylinders 13, 13 has two hydraulic chambers H, I partitioned by each of cylinder pistons 14C, 14C made slidable in the cylinder main bodies 14B, 14B, and cylinder rods 14A, 14A are connected with cylinder piston 14C, 14C and made retractable relative to the cylinder main bodies 14C, 14C. Thus, the floating weight 9 is moved elevatably to the mixing chamber 5 by advancing or retracting the cylinder rods 14A, 14A of the hydraulic cylinders 13, 13 respectively. Further, the material to be mixed (raw material) is charged into the hopper 7 of the internal mixer main body from a charging port not illustrated, and the raw material mixed by the mixing rotors 6,6 in the mixing chamber 5 is taken out of the drop door. Reference numerals 15–17 denote ON/OFF limit switches for monitoring the movement of upper limit/lower limit of the floating weight 9, and they are disposed such that each of them can be in contact with the connecting beam 12 of the floating weight 9. A damper 18 is disposed on the guide bush 10.

The hydraulic circuit 2 has a hydraulic pump P that sucks a hydraulic oil from a hydraulic tank T and discharges the oil into a supply pipeline 20, and the discharging amount (discharging pressure) of the hydraulic oil discharged from the hydraulic pump P is controlled by being driven from a drive motor M. The supply pipeline 20 is connected to an input port 21a of a direction switching solenoid valve 21, and connected also with other hydraulic equipments not illustrated for conducting, for example, ON/OFF of the drop door.

The direction switching solenoid valve 21 comprises, in addition to the input port 21a, two output ports 21c, 21d connected respectively with the hydraulic cylinders 13, 13 of the internal mixer main body 1 and a discharge port 21b connected with the hydraulic tank T, has a neutral position B (position for communicating the discharge port 21b with each of the output ports 21c, 21d), a switching position A (position for communicating the input port 21a with the output port 21d and communicating the discharge port 21b with the output port 21b) and a switching position C (position for communicating the input port 21d with the output port 21c and communicating the output port 21a with the discharge port 21b), and is made switchable to each of the positions A to C by energizing or deenergizing each of the solenoids 21a, 21b. Further, the output port 21c of the direction switching solenoid valve 21 is connected with each of the hydraulic chambers H, H of the hydraulic cylinders 13, 13 (hydraulic side) through the operation pipeline 22, while the output port 21d is connected with each of the hydraulic chambers I, I of the hydraulic cylinders 13, 13 through the operation pipeline 23.

A check throttle valve 24 is disposed to each of the operation pipelines 22, 23 respectively and each of the check throttle valves 24, 24 comprises a variable diaphragm 24A disposed in each of the operation pipelines 22, 23, and a check valve 24B disposed in a by-pass pipeline 25 that by-passes each of the operation pipelines 22, 23, and each check valve 24B permits a flow of a hydraulic oil from the direction switching solenoid valve 21 to each of the hydraulic cylinders 13, 13 and checks a flow in the opposite direction. Further, in the operation pipeline 22, are disposed a pilot check valve 26 to the check throttle valve 24 on the side of the direction switching solenoid valve 21 (upstream) and a relief valve 27 to the throttle valve 24 on the side of each of the hydraulic cylinders 13, 13 (downstream). The pilot check valve 26 usually permit a flow of the hydraulic oil from the direction switching solenoid valve 21 to each of the hydraulic cylinders 13, 13 but checks a flow in the opposite direction, while permits a flow of the hydraulic oil from the hydraulic cylinders 13, 13 to the direction switching solenoid valve 21 by a pilot pressure introduced from the pilot pipeline 27 branched from the operation pipeline 23. The relief valve 27 usually situates at a position shutting from the hydraulic tank T by the spring force of a valve spring 29 and, when the pilot pressure introduced from the pilot pipeline 30 branched from the operation pipeline 22 is increased to greater than the spring force of the valve spring 29, communicates the operation pipeline 22 with the tank T to escape the oil to the hydraulic tank T when the hydraulic oil supplied to each of the hydraulic chambers H, H of the hydraulic cylinders 13, 13 (hydraulic side) is increased abnormally.

Then, the hydraulic circuit 2 is connected by way of an auxiliary hydraulic circuit 30 disposed separately from the internal mixer main body 1. The auxiliary hydraulic circuit 30 has a hydraulic pressure introduction pipeline 31 branched from the supply pipeline 20 and connected to the pneumatic/hydraulic pressure converter 3 and a conversion pipeline 32 further branched from the hydraulic pressure introduction pipeline 31 and connected with the operation pipeline 22 situated to the relief valve 27 on the side of each of the hydraulic cylinders 13, 13 (downstream), and solenoid switching valves 33, 34 are disposed in the pipelines 31, 32 respectively.

The solenoid switching valve 33 has a communication position D (position for communicating the hydraulic pump P with the pneumatic/hydraulic pressure converter 3) and a shut-off position E (position for shutting-off the hydraulic pump P and the pneumatic/hydraulic pressure converter 3), and is made switchable to the communication position D upon energization of the solenoid 33A and to the shut-off position E upon deenergization thereof. Further, the solenoid switching valve 34 has a shut-off position F (position for shutting off the hydraulic cylinders 13, 13 and the pneumatic/hydraulic pressure converter 3) and a communication position G (position for communicating the hydraulic cylinders 9, 9 with the pneumatic/hydraulic pressure converter 3), and is made switchable to the communication position G upon energization of the solenoid 34A and to the shutting-off position F upon deenergization thereof. A check valve 35 is disposed to the hydraulic pressure introduction pipeline 31 situated to the solenoid switching valve 33 on the side of the pneumatic/hydraulic pressure converter 3 and is adapted to permit a flow of the hydraulic oil from the solenoid switching valve 33 to the pneumatic/hydraulic pressure converter 3, while check a flow in the opposite direction.

The pneumatic/hydraulic pressure converter 3 has a small diameter space 3A and a large diameter space 3B which are air-tightly partitioned in a main body 40 and a conversion piston 41 is disposed in the spaces 3A, 3B. The conversion piston 41 is made vertically movable to the main body 40 such that a smaller diameter head 43 formed at the upper end of a piston rod 42 extending to each of the spaces 3A, 3B is slidably inserted in the small diameter space 3A and a large diameter head 44 formed to the lower end of the piston rod 42 is slidably inserted in the large diameter space 3B. The conversion piston 41 defines a hydraulic chamber K (hydraulic side) between the small diameter head 43 and the upper end of the main body 40, and a pneumatic chamber L (pneumatic side) between the large diameter head 44 and the lower end of the main body 40 pneumatic side) respectively.

and the hydraulic pressure introduction pipeline 31 of the auxiliary hydraulic circuit 30 is connected with the hydraulic chamber K Further, a striker 45 is attached to the large diameter head 44 of the conversion piston 41 and extends toward the small diameter head 43 and protrudes externally out of the main body 40. ON/OFF limit switches 46, 47 are disposed to the upper limit and the lower limit for the movement of the conversion piston 41, and they are adapted to monitor the upper limit/lower limit for the movement of the conversion piston 41 upon contact with the striker 45 that moves following after the vertical movement of the conversion piston 41.

The pneumatic circuit 4 has a pneumatic pressure introduction pipeline 51 for connecting a pneumatic chamber L (pneumatic side) of the pneumatic/hydraulic pressure converter 3 with a compressor 50, and a pneumatic tank 52 of a predetermined capacity is disposed to the pneumatic pressure introduction pipeline 51. A check valve 53 and a pressure reduction valve 54 are disposed in this order to the pneumatic introduction pipeline. 51 situating to the pneumatic tank 52 on the side of the compressor 50, and the check valve 53 is adapted to permit a flow of the pneumatic air from the compressor 50 to the pneumatic/hydraulic pressure converter 3 and checks a flow in the opposite direction. The pressure reduction valve 54 is adapted to control a pneumatic pressure of a pneumatic air supplied from the compressor 50 by way of the pneumatic tank 52 to the pneumatic chamber L (pneumatic side) of the pneumatic/ hydraulic pressure converter 3 based on a relationship between a pilot pressure introduced from a pilot pipeline 55 branched from a pneumatic pressure introduction pipeline 51 situating between the pressure reduction valve 54 and the check valve 53, and spring force of a valve spring 54A. Further, an opening/closure valve 56 and a safety valve 57 are connected respectively to the pneumatic tank 52 for releasing the pneumatic air to the outside if the pneumatic pressure at the inside of the pneumatic tank rises abnormally. There are also shown a pressure switch 58 for monitoring the pressure of the pneumatic air introduced into the pneumatic chamber L (pneumatic side) of the pneumatic/hydraulic pressure converter 3 and a pressure gauge 59 for monitoring the pressure of the pneumatic air passing from the pressure reduction valve 54 to the check valve 53.

The internal mixer X according to the present invention having thus been constituted will be explained for the operation of the internal mixer X with reference to FIG. 1 to FIG. 3. For the sake of explanation it is assumed, as shown in FIG. 1, that each of the cylinder rods 14A, 14A of the hydraulic cylinders 13, 13 is extended to a position at which the weight 9 is raised to its upper limit, while the direction switching solenoid valve 21 situates at an intermediate position B, while the solenoid switching valves 33, 34 are at shut-off positions E, F.

(1) For mixing material to be mixed (raw material), it is charged from a charging port not illustrated into the hopper 7 and, at the same time, pneumatic air discharged from the compressor 50 of the pneumatic circuit 4 is introduced while being controlled to a predetermined pressure by the pressure reduction valve 55, through the pneumatic tank 52 to the pneumatic chamber L (pneumatic side) of the pneumatic/ hydraulic pressure converter 3, hydraulic oil is discharged from the hydraulic pump P to the supply pipeline 20 by driving the driving motor M in the hydraulic circuit 2, and the solenoid 33A of the solenoid switching valve 33 is energized to switch the valve to the communication position D. The hydraulic oil discharged to the supply pipeline 20 is introduced to the input port 21a of the direction switching solenoid valve 21 and also introduced through the hydraulic pressure introduction pipeline 31, the solenoid switching valve 33 and the check valve 35 to the hydraulic chamber K (hydraulic side) of the pneumatic/hydraulic pressure converter 3. Then, as shown in FIG. 1, by the hydraulic oil introduced to the hydraulic chamber K (hydraulic side) of the pneumatic/hydraulic pressure converter 3, the conversion piston 41 moves downwardly while increasing the capacity of the hydraulic chamber K (hydraulic side) and decreasing the capacity of the pneumatic chamber L and, when the striker 45 is in contact with the limit switch 47 and turns "ON", the solenoid 33A of the solenoid switching valve 33 is deenergized to switch the valve from the communication position D to the shut-off position E.

Since the supply of the hydraulic oil from the hydraulic pump P is shut-off, the pneumatic/hydraulic pressure converter 3 is kept to an initial state in which the conversion piston 41 is moved to the lower limit. That is, while the hydraulic air introduced from the compressor 50 of the pneumatic circuit 2 through the pneumatic tank 52 to the pneumatic chamber L (pneumatic side) of the pneumatic/hydraulic pressure converter 3 is elevated gradually to a predetermined pressure by way of the pneumatic tank 52 having a predetermined capacity. Since each of the solenoid switching valves 33, 34 is situated to the shut-off position E, F when the conversion piston 41 of the pneumatic/hydraulic pressure converter 3 is in the initial state, the pneumatic/hydraulic pressure converter 3 keeps the conversion piston 41 at the initial state without converting the pneumatic air (pneumatic pressure) in the pneumatic chamber L by way of the conversion piston 41 to the hydraulic oil (hydraulic pressure) in the hydraulic chamber K.

(2) After elapse of a predetermined period of time while keeping the pneumatic/hydraulic pressure converter 3 at the initial state, when the direction switching solenoid valve 21 is switched to the switching position C, the hydraulic pressure oil introduced to the input port 21a of the direction switching solenoid valve 21 is supplied from the output port 21c of the direction switching solenoid valve 21 by way of the pilot check valve 26 and the check throttle valve 24 of the operation pipeline to the hydraulic chamber H hydraulic side) in each of the hydraulic cylinders 13, 13.

Then, each of the cylinder rods 14A, 14A of the hydraulic cylinders 13, 13 is retracted into the main body 40 by the hydraulic oil supplied to each of the hydraulic chambers H, H (hydraulic side) while returning the hydraulic oil in the hydraulic chambers I, I to the hydraulic tank T by way of the check throttle valve 24 of the operation pipeline 23 and the output port 21d and the discharge port 21b of the direction switching solenoid valve 21, and the weight 9 also moves downwardly while forcing the raw material charged in the hopper 7 into the mixing chamber 5 following after the retraction of each of the cylinder rods 14A, 14A.

Then, when each of the cylinder rods 14A, 14A in the hydraulic cylinders 13, 13 (weight 9) moves downwardly and the connection beam 12 in contact with the limit switches 16 and 17 in this order and turned "ON", the solenoid 21B of the direction switching solenoid valve 21 is deenergized to switch the valve from the switching position C to the neutral position B. Since this stops the retraction of each of the cylinder rods 14A, 14A in the hydraulic cylinders 13, 13, downward movement of the weight 9 is also stopped to reach a state in which the raw material can be mixed in the mixing chamber 5.

(3) Subsequently, the solenoid 34A of the solenoid switching valve 34 is energized to switch the valve from the shut-off position F to the communication position G and the mixing rotors 6, 6 disposed in the mixing chamber 5 are rotated. Then, since the pressure chamber K (hydraulic side) of the pneumatic/hydraulic pressure converter 3 is in communication with each of the hydraulic chambers H, H (hydraulic side) in the hydraulic cylinders 13, 13 by way of the solenoid switching valve 34, the conversion pipeline 32 and the operation pipeline 22, the pressure of the pneumatic air introduced to the pneumatic chamber L (pneumatic side) of the pneumatic/hydraulic pressure converter 3 overcomes the pressure of the hydraulic oil introduced to the hydraulic chamber K (hydraulic side), displaces the conversion piston 41 upwardly by a difference between the pressure of the pneumatic air and the pressure of the hydraulic oil, to convert the pressure of the pneumatic air into the pressure of the hydraulic oil.

Then, since the hydraulic oil introduced to the hydraulic chamber K (hydraulic side) of the pneumatic/hydraulic pressure converter 3 is introduced by way of the solenoid switching valve 34, the conversion pipeline 32 and the operation pipeline 22 to each of the hydraulic chambers H, H (hydraulic side) of the hydraulic cylinders 13, 13, each of the cylinder rods 14A, 14A of the hydraulic cylinders 13, 13 is retracted, forces the raw material by the weight 9 further into the mixing chamber 5 and makes the same to be engaged with each of the mixing rotors 6, 6.

(4) When the raw material is engaged to each of the mixing rotors 6, 6, a portion of the material is introduced into the mixing chamber 5 and mixed by the rotation of each of the mixing rotors 6, 6. In this case, since the mixing rotors 6, 6 rotate so as to introduce the portion of the material into the mixing chamber 5 and raise other portion of the material to the outside of the mixing chamber 5, the weight 9 uprises slightly by the reaction force caused by the raising of the raw material to be mixed.

Then, when the weight 9 uprises slightly, each of the cylinder rods 14A, 14A of the hydraulic cylinders 13, 13 is slightly extended by way of the stem 11 and the connection beam 12 following after the rising of the weight 9 and, by the extension of the cylinder rods 14A, 14A, the hydraulic oil introduced into each of the hydraulic chambers H, H (hydraulic side) of the hydraulic cylinders 13, 13 is returned by way of the operation pipeline 22, the conversion pipeline 32 and the solenoid switching valve 34 to the hydraulic chamber K (hydraulic side) of the pneumatic/hydraulic pressure converter 3.

Thus, the conversion piston 41 is slightly lowered by the difference between the pressure of the hydraulic oil returned to the hydraulic chamber K (hydraulic side) and the pressure of the pneumatic air in the pneumatic chamber L (pneumatic side) of the pneumatic/hydraulic pressure converter 3, and the pressure of the hydraulic oil is converted into the pressure of the pneumatic air, whereby the reaction is received in a damped manner, to provide the cushioning function of the weight 9. In this case, when the conversion piston 41 is lowered slightly, the capacity of the pneumatic chamber L (pneumatic side) of the pneumatic/hydraulic pressure converter 3 is increased to elevate the pressure, but the pressure elevation is reduced by the return of the pneumatic air by way of the pneumatic pressure introduction pipeline 51 to the pneumatic tank 52 having a capacity greater than that of the pneumatic chamber L (pneumatic side).

As described above, the conversion piston 41 of the pneumatic/hydraulic pressure converter 3 is moved upwardly by pressure conversion between the hydraulic oil introduced into the hydraulic chamber K (hydraulic side) and the pneumatic air introduced into the pneumatic chamber L (pneumatic side) of the pneumatic/hydraulic pressure converter 3, under the cushioning function of the weight 9, whereby the raw material is gradually introduced into the mixing chamber 5 and mixed by the rotation of each of the mixing rotors 6, 6.

Then, when the mixing for the raw material is completed by the rotation of the mixing rotors 6, 6 in the mixing chamber 5 and the solenoid 21A of the direction switching solenoid valve 21 is energized to switch the valve from the neutral position B to the switching position A, the hydraulic oil introduced to the input port 21a of the direction switching solenoid valve 21 is supplied from the output port 21a of the direction switching solenoid valve 21 by way of the check throttle valve 24 of the operation pipeline 23 to each of the hydraulic chambers I, I of the hydraulic cylinders 13, 13.

Subsequently, each of the cylinder rods 14A, 14A of the hydraulic cylinders 13, 13 is extended out of the main body 40 by the hydraulic oil supplied to the hydraulic chambers I, I while returning the hydraulic oil in the hydraulic chambers H, H to the hydraulic tank T by way of the check throttle valve 24 of the operation pipeline 22, the pilot check valve 26 turned to an open state by the pilot pressure introduced from the pilot pipeline 28 and the output port 21d and the discharge port 21b of the direction switching solenoid valve 21, and the weight 9 is also raised following after the extension of each of the cylinder rods 14A.

Then, when each of the cylinder rods 14A, 14A (weight 9) of the hydraulic cylinders 13, 13 is raised and when the connecting beam 12 is brought into contact with the limit switch 15 and turned "ON", the solenoid 21A of the direction switching solenoid valve 21 is deenergized to switch the valve from the switching position A to the neutral position B. Since this stops the extension of each of the cylinder rods 14A, 14A of the hydraulic cylinders 13, 13, uprising of the weight 9 is also stopped (6) Subsequently, the raw material mixed in the mixing chamber 5 is taken out through the drop door and again the operations described in (1) to (5) above are repeated for mixing.

In the internal mixer according to the present invention, means for elevating the weight 9 is illustrated as by a pair of hydraulic cylinders 13, 13 integrated by way of the stem 11 and the connection beam 12, but the invention is not restricted only thereto. It may also be adapted such that the weight 9 is secured to the top end of the cylinder rods 14A in a single hydraulic cylinder 13, the weight 9 is lowered toward the mixing chamber 5 by the extension of the cylinder rod 14A and the weight 9 is raised from the mixing chamber 5 by the retraction of the cylinder rod.

Further, in the internal mixer according to the present invention, the pneumatic/hydraulic pressure converter 3 has been explained for the constitution in which the hydraulic chamber I and the pneumatic chamber L are defined by vertically moving the conversion piston 41, but the present invention is not restricted only thereto. Alternatively, it may be so constituted that the hydraulic chamber K (hydraulic side) and the pneumatic chamber L (pneumatic side) are defined by moving the conversion piston 41 in a lateral direction (direction in perpendicular to the vertical direction).

Further, in the internal mixer according to the present invention, the hydraulic circuit 2, the auxiliary hydraulic circuit 30 and the pneumatic circuit 4 are shown merely as an example, but it may be in any other appropriate circuit constitution. Further, while the pneumatic tank 52 is disposed to the pneumatic pressure introduction pipeline 51 of the pneumatic circuit 4 in the illustrated embodiment, it may have a constitution of not using the pneumatic tank 52 so long as the pressure elevation in the pneumatic chamber L is permitted upon slight downward movement of the conversion piston 41 of the pneumatic/hydraulic pressure converter 3, with regard to the cushioning function of the weight 9.

Further, the internal mixer according to the present invention has been explained to such a type that the raw material to be mixed is engaged with each of the mixing rotors 6, 6, but the invention may be applicable also to a not-engaging type closed internal mixer.

Further, in the illustrated internal mixer according to the present invention, the pneumatic/hydraulic pressure converter 3 is disposed separately from the internal mixer main body 1, but the invention is not restricted only thereto. Alternatively, the converter 3 may be disposed to the internal mixer main body 1, providing that it causes no trouble to the elevation of the hydraulic cylinder 13 or the floating weight 9.

Furthermore, in the internal mixer according to the present invention, switching from the direct supply of the hydraulic pressure from the hydraulic circuit 2 to the hydraulic chambers H, H of the hydraulic cylinders 13, 13 to the supply of the hydraulic pressure from the hydraulic chamber K of the pneumatic/hydraulic pressure converter 3, in order to lower the floating weight 9, may be conducted by switching from direct supply of the hydraulic oil from the hydraulic circuit 2 to the hydraulic chambers H, H of the hydraulic cylinders 13, 13 to the supply of the hydraulic pressure from the hydraulic chamber K of the pneumatic/ hydraulic pressure converter 3 by detecting the lowering distance of the floating weight 9 or the hydraulic pressure exerting in each of the hydraulic chambers I, I of the hydraulic cylinders 13, 13 by detection means (for example, limit switch 16, 17 or pressure sensor), and at a point where the floating weight 9 lowers by a predetermined distance or the hydraulic oil in each of the hydraulic chambers I, I of the hydraulic cylinders 13, 13 reaches a predetermined pressure (switching the direction switching solenoid valve 21 to the neutral position B, the solenoid switching valve 33 to the shut-off position E and the solenoid switching valve 34 to the communication position G).

As described above according to the internal mixer of the present invention, the following advantageous effects can be obtained In the basic constitution, the floating weight can be lowered so as to force the raw material to be mixed into the internal mixer main body by the supply of the pressure on the pneumatic side which is converted into the hydraulic side by the pneumatic/hydraulic pressure conversion means. Further, when the floating weight undergoes reaction from the internal mixer main body by way of the raw material the reaction is returned as the hydraulic pressure to the pneumatic/hydraulic pressure conversion means and converted to the pneumatic side by the pneumatic/hydraulic pressure conversion means, thereby receiving the reaction in a damped manner to provide the floating weight with the cushioning function.

As described above, since the size in the height of the closed internal mixer can be reduced to make the structure compact by disposing the pneumatic/hydraulic pressure conversion means for providing the cushioning function to the floating weight separately from the internal mixer main body, it can facilitate integral transportation, installation to the facility and maintenance.

Further, since the pneumatic/hydraulic pressure conversion means is disposed separately from the internal mixer main body, only the hydraulic cylinders undergo the effects of surrounding circumstances such as raw material charged in the hopper or dusts present in the internal mixer, and since no provision is required for the pipeline accompanying the elevation of the floating weight, and highly reliable mixing can be conducted with easy maintenance.

Further, since the pneumatic/hydraulic pressure conversion means provides the floating weight with the cushioning function or the like by the pressure conversion between the hydraulic and pneumatic pressures, consumption of the pneumatic pressure and discharge sounds can be eliminated, and the running cost can be reduced.

In addition to the effects described above obtained by the basic constitution, further advantages can be provided as below.

In a preferred embodiment, when the floating weight undergoes the reaction from the internal mixer main body and when this is returned as the hydraulic pressure to the pressure side of the pneumatic/hydraulic pressure conversion means, the pressure of the pneumatic side is elevated but the pressure elevation is absorbed by the pneumatic tank and the abnormal pressure increase in the pneumatic side of the pneumatic/hydraulic conversion means can be decreased.

In another preferred embodiment, when the hydraulic side of the pneumatic/hydraulic conversion means is connected with the hydraulic circuit, the hydraulic pressure for forcing the raw material into the internal mixer main body by the floating weight can be accumulated in the hydraulic side of the pneumatic/hydraulic pressure conversion means to keep the same to the initial state and when the hydraulic side of the pneumatic/hydraulic pressure conversion means is connected with the hydraulic side of the hydraulic cylinder, the cushioning effect can be provided to the floating weight.

In a further preferred embodiment, since the members supported by the hydraulic cylinder are only the floating weight, the stem and the beam, the rigidity of the internal mixer main body and the hopper may be reduced, so that the weight and the production cost of the internal mixer main body per se can be reduced.

Further, since the hydraulic cylinder is integrated by way of the stem and the beam to the floating weight, oil leaked from the hydraulic cylinder does not intrude from the hopper to the internal mixer main body.

What is claimed is:

1. An internal mixer, comprising:

a floating weight disposed contiguously with an internal mixer main body, whereby said floating weight is elevatable in a hopper to which a material to be mixed is charged;

at least one hydraulic cylinder mechanically interfaced with said floating weight, said cylinder disposed contiguously with the internal mixer main body and, said cylinder including a hydraulic side for lowering said floating weight;

a pneumatic/hydraulic pressure conversion means for pressure conversion, said conversion means including a hydraulic side and a pneumatic side, said conversion means providing pressure conversion between said hydraulic and pneumatic sides, said conversion means disposed separately from the internal mixer main body, said hydraulic side of said hydraulic cylinder for lowering said floating weight being fluidically connected with the hydraulic side of said pneumatic/hydraulic pressure conversion means.

2. An internal mixer as defined in claim 1, wherein the pneumatic side of said pneumatic/hydraulic pressure conversion means is fluidically interfaced with a pneumatic tank, said pneumatic side being supplied with a pneumatic pressure through said pneumatic tank.

3. An internal mixer as defined in claim 1, wherein said hydraulic cylinder further comprises a hydraulic side for raising said floating weight, and wherein said hydraulic side of said pneumatic/hydraulic pressure conversion means is made switchable to each of the hydraulic side of said hydraulic cylinder and an auxiliary hydraulic circuit for supplying a hydraulic pressure.

4. An internal mixer as defined in claim 1, further comprising a stem, a beam, at least two hydraulic cylinders and two rods wherein said stem connected with said floating weight is attached to said beam, and said rods of said hydraulic cylinders are connected on both ends of the beam, whereby said floating weight is made elevatable to the inside of the hopper.

* * * * *